No. 879,526. PATENTED FEB. 18, 1908.
R. A. DENOVAN.
ROOT PULLER.
APPLICATION FILED MAR. 9, 1907.
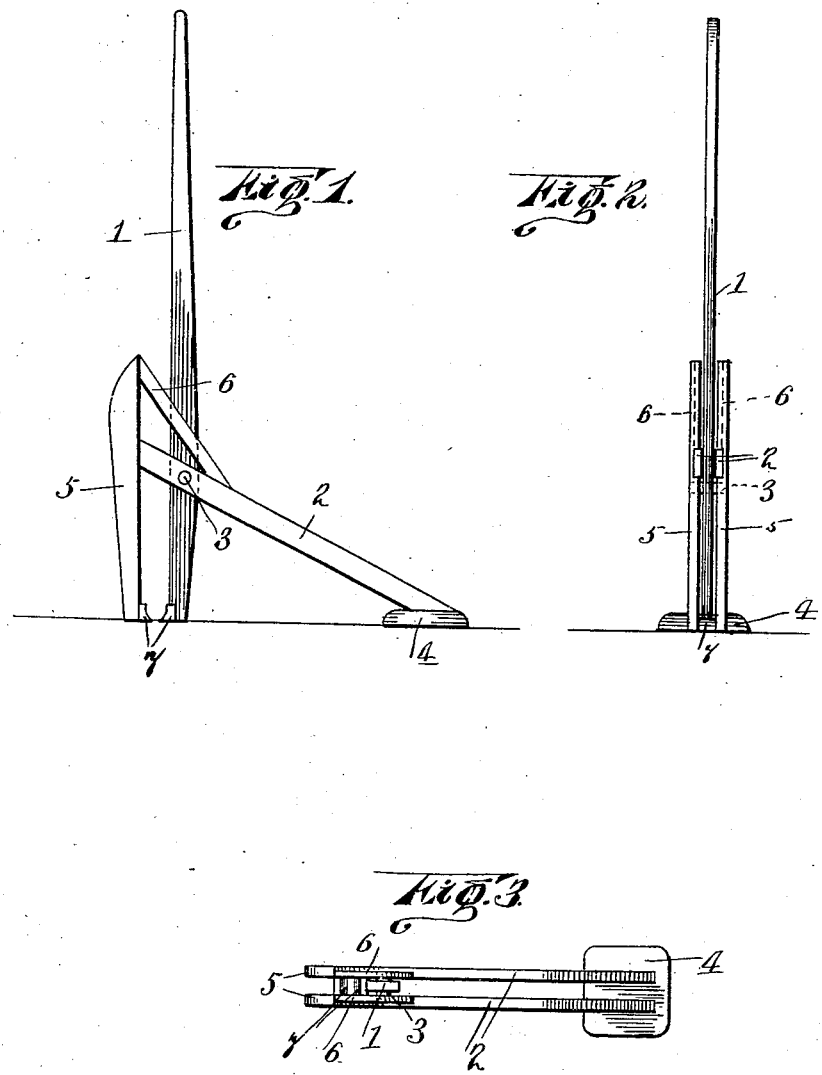

UNITED STATES PATENT OFFICE.

ROBERT ANDREW DENOVAN, OF DALKEITH, ONTARIO, CANADA.

ROOT-PULLER.

No. 879,526.

Specification of Letters Patent.

Patented Feb. 18, 1908.

Application filed March 9, 1907. Serial No. 361,561.

*To all whom it may concern:*

Be it known that I, ROBERT ANDREW DENOVAN, a subject of the King of Great Britain, residing at Dalkeith, county of Glengarry, in the Province of Ontario, Canada, have invented certain new and useful Improvements in Root-Pullers; and I do hereby declare that the following is a full, clear, and exact description of the invention, such as will enable others skilled in the art to which it appertains to make and use the same.

My invention relates to root pullers; the object of my invention is to provide a simple device adapted to pull beets and similar vegetables from the soil; a further object is to provide a device which will be normally open to grip the vegetable to be pulled, and which is formed so as not to injure the vegetable in the operation of extracting it from the soil; and, my invention consists of the construction, combination and arrangement of parts, as herein illustrated, described and claimed.

In the accompanying drawings, forming part of this application, I have illustrated one form of embodiment of my invention, in which drawings similar reference characters designate corresponding parts, and in which:

Figure 1 is a side elevation. Fig. 2 is a front elevation; and, Fig. 3 is a plan view.

Referring to the drawings, 1 designates a handle, to which is pivotally connected the inclined braces 2, as by means of the pivot pin 3 extending horizontally through the braces and the handle.

Carried by one end of the inclined braces 2, is a weighted base 4. Secured to the opposite ends of the inclined braces 2 are vertical arms 5, having their upper ends connected to the braces 2 by the rigid struts 6.

Carried by the lower ends of the handle 1 and the vertical arms 5, are the oppositely disposed concaved gripping members 7, which may be formed of wood or metal, as may be desired. The object of having the gripping members concaved is to provide a construction which will approximate the contour of the under side of a beet or similar vegetable, so that the vegetable is not injured in the operation of extracting it from the soil.

In the operation of the invention, when the handle 1 is elevated, the weighted base 4 rocks the inclined braces 2 downward, and thus throws the lower ends of the vertical arms 5 away from the lower end of the handle 1, and normally maintains the device in open position ready for gripping the vegetable to be extracted from the soil.

The vegetable being grasped by the gripping members 7, the weighted base 4 forms a support for the pivoted pin 3, which is the fulcrum for the lever handle 1, so that the vegetable is pulled upward and in a horizontal direction, and easily extracted from the soil.

Having thus fully descibed my invention, what I claim as new, and desire to secure by Letters Patent, is:—

In a root pulling device, parallel inclined braces, a vertical arm rigidly secured thereto, parallel inclined struts rigidly connecting said arm and braces, a lever handle pivotally mounted between the aforesaid braces, gripping jaws secured to the lever and arm respectively and adapted to coöperate the one with the other, and a weighted base member carried by the aforesaid parallel braces and adapted to maintain the device in operative position.

In witness whereof I have hereunto set my hand in the presence of two witnesses.

ROBERT ANDREW DENOVAN.

Witnesses:
 ELMA MOONEY,
 P. S. PAGENT.